Nov. 27, 1934.    L. M. CHAPMAN    1,981,845
TYPOGRAPHICAL MACHINE
Filed July 7, 1932    2 Sheets-Sheet 1
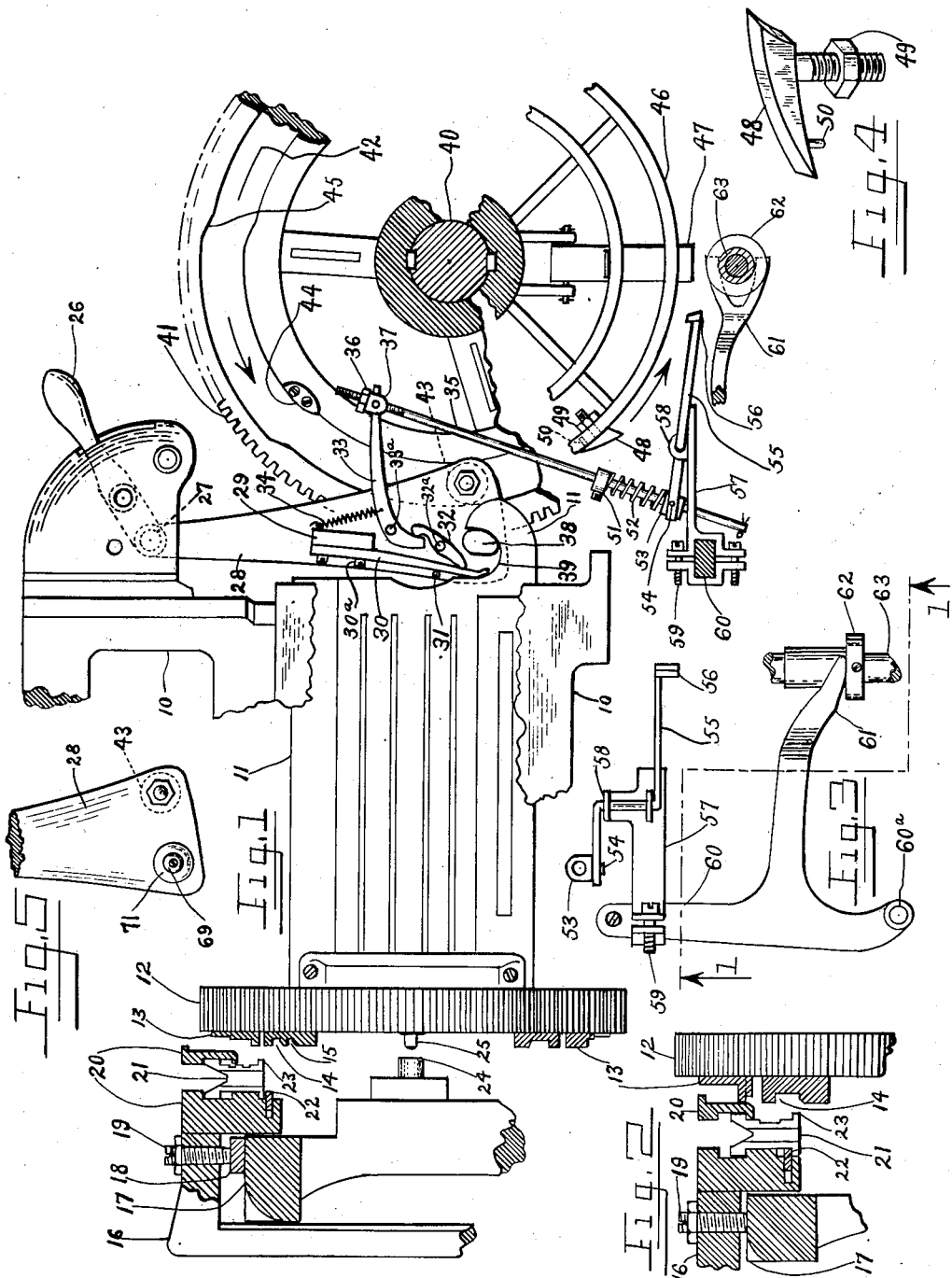

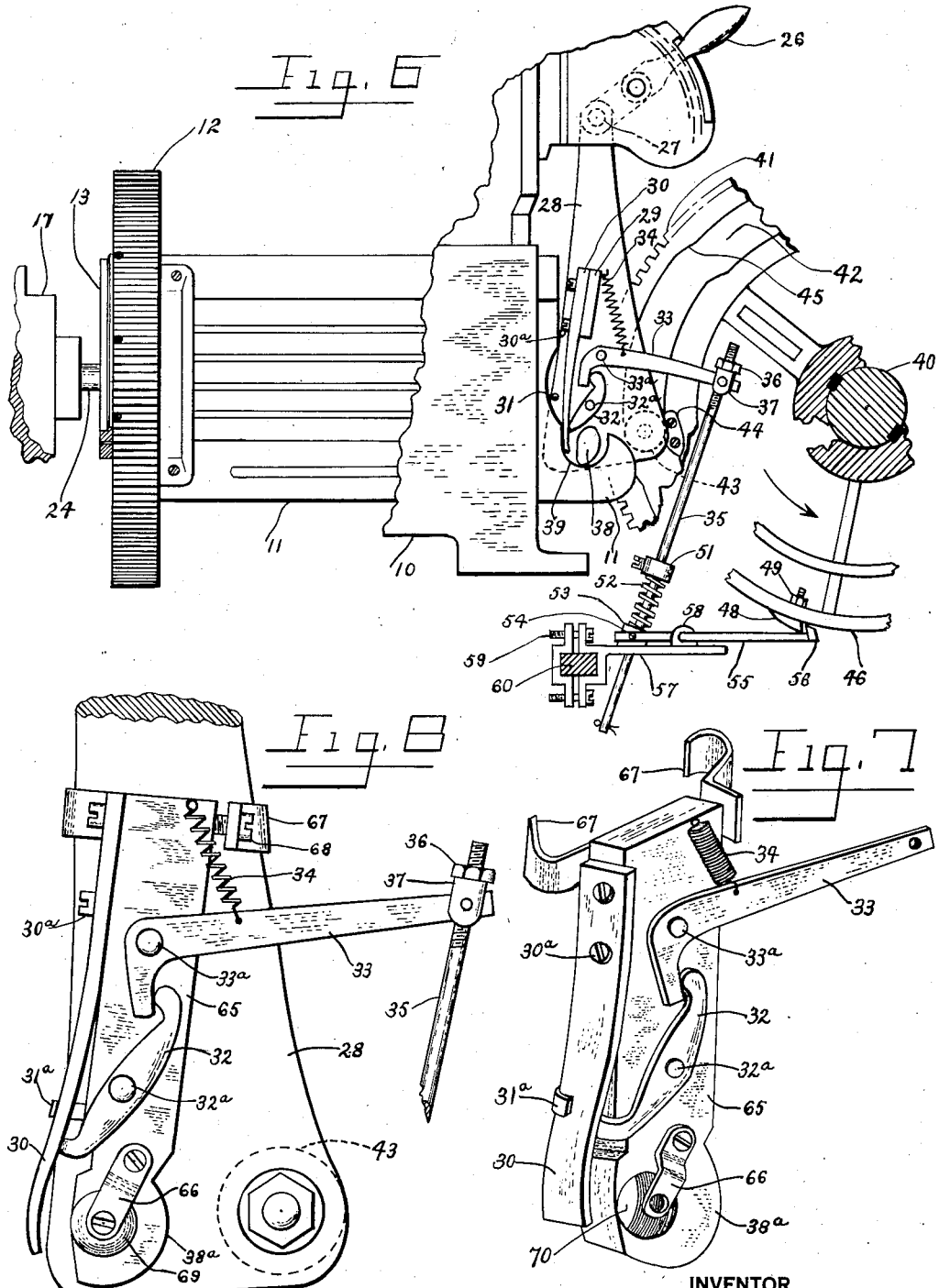

Patented Nov. 27, 1934

1,981,845

UNITED STATES PATENT OFFICE 1,981,845

TYPOGRAPHICAL MACHINE

Leo M. Chapman, Chicago, Ill.

Application July 7, 1932, Serial No. 621,171

18 Claims. (Cl. 199—52)

This invention relates to typographical machines of the class known under the trade-mark names "Linotype", "Intertype" etc. wherein assembled matrices are presented in front of a mold which is moved horizontally into alignment against them. The casting operation of machines of this character is preceded by an accurate lineup and lockup of the mold and the matrices with respect to aligning grooves on the mold, and lugs or ears on the matrices which enter these grooves. The height at which the matrices face the mold is under the control of the operator. Due to negligence on his part to make certain necessary adjustments, this accurate alignment is lost, thereby causing the mold to come into contact with the ears of the matrices or the jaws which support the matrix line, resulting in damage to the assembled matrices, the mold or the jaws, a squirt of metal and an excessive strain on the machine which often results in the breakage of expensive parts.

The general object of the invention is to provide means for automatically stopping machines of this class whenever the matrices are improperly aligned in front of the mold or when the matrix supporting jaws are improperly placed or when any obstruction prevents the mold from locking against the matrix line thereby preventing damage to the machine and saving time and the effects of a metal squirt.

Another object of this invention is to provide means which can be applied to any outstanding linotype machine regardless of model without the replacement of expensive parts.

A still further object is to provide a device which has motion-increasing means thereby assuring a quick stop upon a slight cause, as a deposit of metal upon the mold, a thin matrix reversed in the line, top down, and also a means to allow a great range of movement of the mold slide 11 against a resilient member 30 before excessive pressure and breaking strain is produced, as in the case of a mold 13 being forced against the mold disk locking bushing 24 due to improper timing of mold gears as shown in Fig. 6.

Other and further objects are to provide a means which is readily applicable, easily accessible and occupies little space.

I attain these objects as will readily become apparent to persons skilled in the art, by mechanism illustrated in the accompanying drawings, wherein:—

Fig. 1 represents a fragmentary vertical section taken through a typographical machine showing a form of the invention as applied to the mold slide actuating lever 28, and to the clutch operating lever 60 with the operating rod 35 between the two mechanisms.

Fig. 2 is a fragmentary detail view showing the mold 13 colliding with the jaw 20 due to the absence of the filling piece 18 under the screw 19.

Fig. 3 is a top plan view of that portion of the invention which is attached to the usual clutch operating lever 60. A view on the line 1—1 shows a vertical section of this mechanism in Fig. 1.

Fig. 4 is a perspective view of a part of the invention, the hook or catch member 48 which is attached to the ejector lever retracting cam 46 between the automatic safety pawl 47 and the stop pawl (not shown herein).

Fig. 5 shows the lower portion of the conventional mold slide actuating lever 28 with the roller 71 which this invention dispenses with.

Fig. 6 is another fragmentary vertical section showing the invention with the catch member 48 almost in contact with the hook or pawl 56 and about to stop the machine. The mold gears being "out of time" have caused the mold 13 to collide with the mold bushing 24 thus flexing the spring 30.

Fig. 7 is a perspective view of the attachment shown in Fig. 8.

Fig. 8 shows a view of the lower portion of the mold slide actuating lever 28 with the invention Fig. 7 applied thereto as an attachment instead of being constructed integral with the slide actuating lever as shown in Fig. 6.

In all these views, the same reference characters indicate similar parts. The description herein is confined to the particular parts of the machine affected by this invention.

Referring to the drawings:—In the conventional typographical machine not equipped with this invention, the mold slide 11 is slidably mounted in ways in the frame 10. The mold disk 12 which carries the molds 13 revolves on a bearing at the end of the slide. The assembled matrices 21 are held in jaws 20 and presented in front of the mold by the "first elevator" 16. The proper alignment of the matrices in front of the mold is accomplished by a banking screw 19, and a filling piece or slidable alignment bar 18 on the vise cap 17. The filling piece is readily movable in or out of contact with the banking screw. Most matrices up to 14-point have two characters or letters on the casting edge and must be presented in front of the mold slot at the proper level. The matrices 21 are held in jaws 20 either above or below the rail 22 or as a mixed line, part in each position at the same time. The matrix ears 23 enter mold grooves 14 or 15 for alignment, or in both grooves as a mixed line when the mold advances. The difference in position of the mold grooves 14 and 15 as well as the difference in position of the matrices above and below the rail 22 corresponds to the thickness of the filling piece 18. If a mixed line is presented to the mold then the filling piece 18 must not be placed under the banking screw 19. If it is, the matrices with ears below the rail 22 will enter the upper mold slot 14 while those above the rail will be crushed by the mold. In Fig. 1 the matrix 21 is on the rail 22 and the filling piece 18 is under the screw 19. This places the matrix in a position in which the matrix ear 23 cannot enter the mold groove 14. If the mold locks up against the matrix, the ear will be crushed. With the matrix below the rail 22 or with the filling piece removed, the ear 23 will enter the groove 14. With the matrix below the rail and also with the filling piece removed the ear will enter groove 15. If a display or headletter mold 13, Fig. 2 is used then the filling piece must be under the banking screw. If it is not, the mold will collide with the first elevator jaws 20, as seen in Fig. 2. Matrices must not be on the rail when using this mold as they will be crushed. These facts must constantly be held in mind by the operator. When the mold locks up against the matrices, the mold disk dowels 25 enter the bushings 24 thereby preventing the mold from moving. The usual mold slide actuating lever 28, Fig. 5, carries two rollers. One of these rollers 43 is actuated by the cam 42, Fig. 1, and the other 71 is supported by the axle or bearing 69. This axle 69 is also shown in Fig. 8. The roller 71 occupies the notch 39 in the end of the slide 11 and serves as a positive non-elastic connection between the slide and the lever 28. In carrying out this invention this roller 71 is dispensed with. It is replaced by the attachment member shown in Fig. 7 wherein the hole 70 fits over the axle 69 as shown in Fig. 8. Another form of the invention is shown in Figs. 1 and 6 wherein the spring 30 and the boss 38 constructed as part of or attached to the lever 28 are substituted for the roller 71 and the axle 69. The spring 30 in Fig. 1 can be attached to the lever by the rib 29 cast on the lever, or by an angle plate. Included as part of the invention is the bracket 57, the pawl or hook lever 55, the hook or catch 48 and the operating rod 35.

Fig. 1 shows the position of the machine just after starting. The first elevator 16 has descended allowing the banking screw 19 to rest upon the filling piece 18. The cams 42 and 46 have moved sufficiently to allow the mold disk 12 to turn the mold 13 into a horizontal position facing the matrices. The matrices are not properly located in front of the mold 13. Either the filling piece 18 must be removed or the matrix line must be below the rail 22 instead of above it in order to allow the ears 23 to enter the mold slot 14. When the cam turns sufficiently so as to allow the shoe 44 to come in contact with the roller 43, the lever 28, which is pivoted at 27 to the usual hand lever 26, will be moved forward, forcing the mold against the matrix ears. It is at this point in the revolution of the machine that this invention begins to function. As the mold is forced against the matrix ears the spring 30 is flexed back from the stop pin 31, as shown in Fig. 6, moving the lever 32 on its fulcrum pin 32ª thereby causing the lever 33 which is supported by the spring 34, to depress the rod 35. The lower part of the rod 35 slides freely in the swivel piece 53 which is pivoted at 54 to the short arm of the pawl or hook lever 55. On the rod 35 is fixed the collar and set screw 51 to which is fastened the spring 52. When the rod 35 is depressed by the lever 33, the hook end 56 of the lever 55 strikes the surface of the cam 46 in the path of the hook or catch 48, Fig. 6. Any over-motion of the lever 33 causes the rod 35 to slide down in the swivel piece 53 and compress the spring 52 thereby preventing the rod from being bent.

In the conventional typographical machine, the cam 46 is keyed to the shaft 40 at one side of the mold cam and gear 41 and revolves with it. The gear cam 41 is driven by a pinion (not shown herein) on the shaft 63, Figs. 1 and 3. A clutch connects this shaft to a power-driven pulley and the clutch is controlled by the clutch operating lever 60 pivoted at 60ª Fig. 3. On the clutch lever 60 is attached the bracket 57 with the clamping screws 59, and the hook or pawl lever 55 pivoted to the bracket at 58. As the cam 46 revolves, it carries the hook or catch 48 into contact with the hook 56 on the lever 55 pulling out the clutch lever 60 and forcing the forked end 61 against the clutch collar 62 thereby stopping the machine. The upper end of the rod 35 is threaded and the angle plate 37 which is loosely pivoted to the lever 33 is threaded to receive this rod. The nut 36 binds the rod to the angle plate to hold the right adjustment. To disengage the slide 11 from the lever 28, the lever 26 is depressed thereby lifting the boss 38 and the spring 30 out of the notch 39. This action also lifts the lever 33 and the attached rod 35. The lower end of the rod slides freely in the swivel piece 53, and the spring 52 which is not attached to the swivel, lifts from it.

In the normal operation of the machine, the spring 30 is of sufficient strength to move the slide 11 into casting position without being flexed. This causes no movement in the lever 33 relative to the lever 28 but there is a slight downward movement of the rod 35 and an upward movement of the hook 56 due to the lever 28 swinging forward on the pivot 27. The hook 56 is adjusted by the threaded part of the rod 35 to just clear hook 48 as it revolves. When the offset portion 45 of the cam 42 strikes the roller 43, the lever 28 is pulled back thereby causing the boss 38 in the notch 39 to withdraw the slide 11 from casting position. If the attachment member 65 in Fig. 7 is being used then the curved portion 38ª performs the same function. This attachment member is held to the usual lever 28 by clamping pieces 67 and a strap 66 and screw. The strap 31ª performs the same function as the pin 31 in Fig. 1; it limits the outward movement of the spring 30 so as to allow the spring and curved portion 38ª free access to the notch 39. If the mold meets with undue resistance while being moved into casting position, the spring 30 is forced back thereby bringing the hook lever 55 into engagement with the cam hook 48. A short pull by the hook 48 on the clutch lever 60 releases the clutch and stops the machine. To start the machine the clutch must be locked by the usual hand stopping lever which presses against the screw post shown at the end of the clutch lever 60, Fig. 3. This allows the machine to be backed up and the trouble remedied. With the pressure on the mold removed, the spring 30 returns to normal position thereby disengaging the hook lever 55 from the cam hook 48.

While I have shown and described two forms of this invention, I am aware that various alterations in construction within mechanical skill may be made without departing from the principles of the invention. I therefore do not propose to be limited to specific parts in respect to their precise form.

Having described my invention, what I claim is:

1. A typographical machine including means for presenting assembled matrices in front of a mold, a mold, mold disk and slide, a power-driven cam, a bell-crank clutch operating lever, a mold slide actuating lever, and means carried by said slide actuating lever to move means carried by said bell-crank clutch operating lever into engagement with means on said power-driven cam thereby causing said power-driven cam means to actuate said bell-crank clutch operating lever to stop the machine.

2. A typographical machine including means for presenting assembled matrices in front of a mold, a mold, mold disk and slide, a power-driven cam, a bell-crank clutch operating lever, a mold slide actuating lever, and means carried by said mold slide actuating lever, by said bell-crank clutch operating lever and by said power-driven cam to coact and stop the machine when the normal movement of the mold toward the assembled matrices is interrupted.

3. In a typographical machine, a mold slide having a customary or usual operating notch or recess therein, a mold slide actuating lever having a pendent plate buffer thereon to enter said recess to move said slide toward the casting position and a boss on said lever to enter said recess to move said slide positively in the reverse direction, said pendent plate buffer and said boss to replace the customary roller on said slide actuating lever which enters said recess.

4. In a typographical machine, a mold slide having a customary or usual operating notch therein, a mold slide actuating lever having a depending plate buffer thereon to enter said notch to move said slide toward the casting position, lever and rod means on said slide actuating lever in contact with and movable by said depending plate buffer when said depending plate buffer is flexed while moving said slide toward casting position, a boss on said mold actuating lever to enter said notch to move said slide positively away from casting position, said depending plate buffer and said boss being readily movable in and out of said notch.

5. In a typographical machine, an automatic stop mechanism comprising a mold slide, a mold slide actuating lever carrying a buffer spring in contact with and for moving said slide, a power-driven cam controlled by a clutch operating lever, a hook or catch member attached to said cam, a pivoted pawl or hook lever carried by said clutch operating lever and operative means interposed between said buffer spring and said pivoted hook lever for moving said hook lever into engagement with said hook member when said buffer spring is flexed.

6. In a typographical machine, means for automatically stopping the machine when the normal movement of the mold 13 into casting position is interrupted, comprising a hook or catch member 48 attached to the ejector lever retracting cam 46 between the automatic safety pawl 47 and the usual stop pawl, a pivoted pawl or hook lever 55 attached to the clutch operating lever 60, a resilient member 30 mounted on the mold slide actuating lever 28 for transmitting motion to the mold slide 11 toward casting position, a boss 38 on the mold slide actuating lever for retracting the slide from casting position, said resilient member and boss to replace the customary slide actuating lever roller 71, lever means 33 operated by said resilient member upon flexure due to abnormal resistance against the mold, and adjustable impelling means 35 between said lever means 33 and said hook lever 55 for bringing into engagement said hook lever 55 with said cam hook 48 when said resilient member 30 is compressed.

7. In a typographical machine, a mold slide, a mold slide actuating lever having the customary projecting axle or bearing for carrying the customary roller thereon, an attachment member having a hole through one end for fitting over said bearing, strap and clamping means for binding said attachment member to said mold slide actuating lever, said attachment member having a rigid portion for positively moving said mold slide out of casting position, a resilient member for moving said mold slide into casting position, lever means operable by said resilient member when said resilient member is flexed, and a spring for keeping said lever means in contact with said resilient member.

8. In a typographical machine, a mold slide having an operating notch therein, a mold slide actuating lever having a projecting axle or bearing for mounting thereon the usual roller which functions within said notch, an attachment member having a hole through one end for fitting over said bearing to replace the usual roller, said attachment member having means for fastening to said mold slide actuating lever, said attachment member also having a semicircular portion for entering said notch for moving said mold slide from casting position and resilient means for moving said mold slide into casting position against the normal frictional resistance of the slide ways and dowels without being flexed.

9. A typographical machine including a mold slide, a power-driven cam, clutch operating means controlling the movement of said cam, a mold slide actuating lever having the customary projecting axle or bearing, an attachment member adapted to be mounted on said axle and secured to said actuating lever, resilient means carried on said attachment member and in contact with said mold slide for transmitting motion thereto toward the casting position and means interposed between said resilient means and said clutch operating means to cause the latter to stop the machine when the mold slide meets with abnormal resistance in its movement into casting position.

10. A typographical machine including means for presenting assembled matrices in front of a mold, a mold, mold disk and a usual or customary slide, a mold slide actuating lever, a pendent plate buffer carried by said slide actuating lever in contact with said slide and for moving said slide, mold disk and mold toward assembled matrices presented, clutch operating means, and lever and rod means interposed between said pendent plate buffer and said clutch operating means.

11. In a typographical machine, an automatic stop mechanism comprising a mold slide, a power-driven cam having a catch member, a bell-crank clutch operating lever carrying a pawl, a mold slide actuating lever having a resilient member for moving said mold slide, said mold slide actuating lever carrying means attached to and for moving said pawl when said resilient member is flexed in moving said mold slide.

12. A typographical machine including means for presenting assembled matrices in front of a mold, a mold, mold disk and slide, a power-driven cam, a bell-crank clutch operating lever, a mold slide actuating lever carrying resilient means and motion increasing lever means operable thereby to move means carried by said clutch operating lever into engagement with catch or dog means on said power-driven cam to stop the machine when said resilient means is flexed while moving said slide and mold toward assembled matrices.

13. In a typographical machine, a mold, mold disk and slide, said slide having an operating notch therein, a mold slide actuating lever and elastic means carried thereby for moving said slide, normally without flexure, into casting position, lever and rod means carried by said slide actuating lever and adapted to transmit motion from said elastic means in a downward direction when said means is flexed, a boss on said slide actuating lever adjacent to said elastic means for the retraction of said mold slide after the casting operation, a clutch operating lever having a pawl operable by said rod means and a power-driven cam having a hook to engage said pawl.

14. A typographical machine including a mold, mold disk and slide, a power-driven cam, a bell-crank clutch lever, a slide actuating lever having resilient means and lever and rod members attached thereto, said resilient means to be flexed when said slide is interrupted in its advance to casting position, said lever and rod members to be moved when said resilient means is flexed and to coact with means on said clutch lever thereby causing said means to interlock with catch or dog means on said power-driven cam and to stop the machine.

15. In a typographical machine including a mold slide, a mold slide actuating lever having resilient means for moving said mold slide, normally without flexure, into casting position, clutch operating means for controlling the movement of the machine, a power-driven cam carrying a hook or catch member thereon, a pawl or hook lever carried by said clutch operating means to engage said hook member on said cam, and means interposed between said resilient means on said slide actuating lever and said pawl lever to move said pawl lever into engagement with said hook or catch member to automatically disengage the clutch when the mold slide is interrupted in its movement to casting position.

16. A typographical machine including a mold slide having an operating notch therein, a mold slide actuating lever, an attachment member adapted to be secured to said slide actuating lever, resilient means on said attachment member adapted to enter said mold slide operating notch, a clutch operating lever carrying a pawl, means interposed between said resilient means and said pawl to move the latter when said resilient means is flexed and a power-driven cam carrying a member for engaging said pawl when said pawl is moved by said resilient means.

17. In a slug-casting machine an automatic safety stopping device comprising a power-driven cam having a detent or dog, a clutch operating lever having a member engageable with said dog and to be moved thereby, a mold slide actuating lever having a pendent plate spring and elastic operative means between said plate spring and said member on said clutch operating lever.

18. In a slug-casting machine, a mold slide having a customary operating notch or recess therein, a mold slide actuating lever having resilient means thereon adapted to enter said recess to impel said mold slide toward casting position and a boss or stud on said lever acting within said recess for the retraction of said mold slide, said resilient means and said boss to replace the usual roller which functions in said mold slide recess.

LEO M. CHAPMAN.